(12) United States Patent
Szocs et al.

(10) Patent No.: US 11,287,631 B2
(45) Date of Patent: Mar. 29, 2022

(54) DEVICE FOR MOVING A MICROSCOPE STAGE AND MICROSCOPE COMPRISING SUCH A DEVICE

(71) Applicant: 3DHistech Kft., Budapest (HU)

(72) Inventors: David Istvan Szocs, Budapest (HU); Janos Tibor Devenyi, Budapest (HU); Viktor Sebestyen Varga, Budapest (HU); Bela Molnar, Budapest (HU)

(73) Assignee: 3DHISTECH KFT.

( * ) Notice: Subject to any disclaimer, the term of this patent is extended or adjusted under 35 U.S.C. 154(b) by 180 days.

(21) Appl. No.: 16/619,266

(22) PCT Filed: Jun. 22, 2018

(86) PCT No.: PCT/HU2018/050030
§ 371 (c)(1),
(2) Date: Dec. 4, 2019

(87) PCT Pub. No.: WO2018/234837
PCT Pub. Date: Dec. 27, 2018

(65) Prior Publication Data
US 2020/0096757 A1   Mar. 26, 2020

(30) Foreign Application Priority Data
Jun. 23, 2017 (HU) .................................. P1700279

(51) Int. Cl.
*G02B 21/26* (2006.01)

(52) U.S. Cl.
CPC .................................. *G02B 21/26* (2013.01)

(58) Field of Classification Search
CPC .......... G02B 21/26; G02B 7/00; G02B 7/001; G02B 21/00; G02B 21/24; G02B 21/36; G02B 21/362; G02B 27/64; G02B 27/646
USPC ........ 359/391, 362, 368, 392, 393, 554, 896
See application file for complete search history.

(56) References Cited

U.S. PATENT DOCUMENTS

| | | |
|---|---|---|
| 4,673,988 A | 6/1987 | Jansson et al. |
| 5,731,896 A | 3/1998 | Baumann et al. |
| 5,996,437 A | 12/1999 | Novak et al. |
| 6,047,613 A | 4/2000 | Kragolnik |
| 6,930,479 B2 | 8/2005 | Xiao et al. |
| 2005/0037406 A1* | 2/2005 | De La Torre-Bueno ..................... G06T 7/0012 435/6.12 |
| 2005/0193576 A1* | 9/2005 | Hollman ............ G01R 31/2891 33/286 |
| 2005/0263170 A1* | 12/2005 | Tannous .................... B08B 5/02 134/1.1 |
| 2010/0157423 A1 | 6/2010 | Houjou et al. |

FOREIGN PATENT DOCUMENTS

| | | |
|---|---|---|
| JP | 10148235 A | 6/1998 |
| WO | 2012040433 A1 | 3/2012 |

* cited by examiner

*Primary Examiner* — Arnel C Lavarias
(74) *Attorney, Agent, or Firm* — Olson & Cepuritis, Ltd.

(57) ABSTRACT

A microscope stage is movably mounted to a base and is movable relative to the base by two separate drive units on separate rail systems situated at an angle relative to one another. The drive units are mechanically isolated from one another and one of the drive units uses a belt drive.

21 Claims, 3 Drawing Sheets

DEVICE FOR MOVING A MICROSCOPE STAGE AND MICROSCOPE COMPRISING SUCH A DEVICE

CROSS-REFERENCE TO RELATED APPLICATIONS

Figure 1:
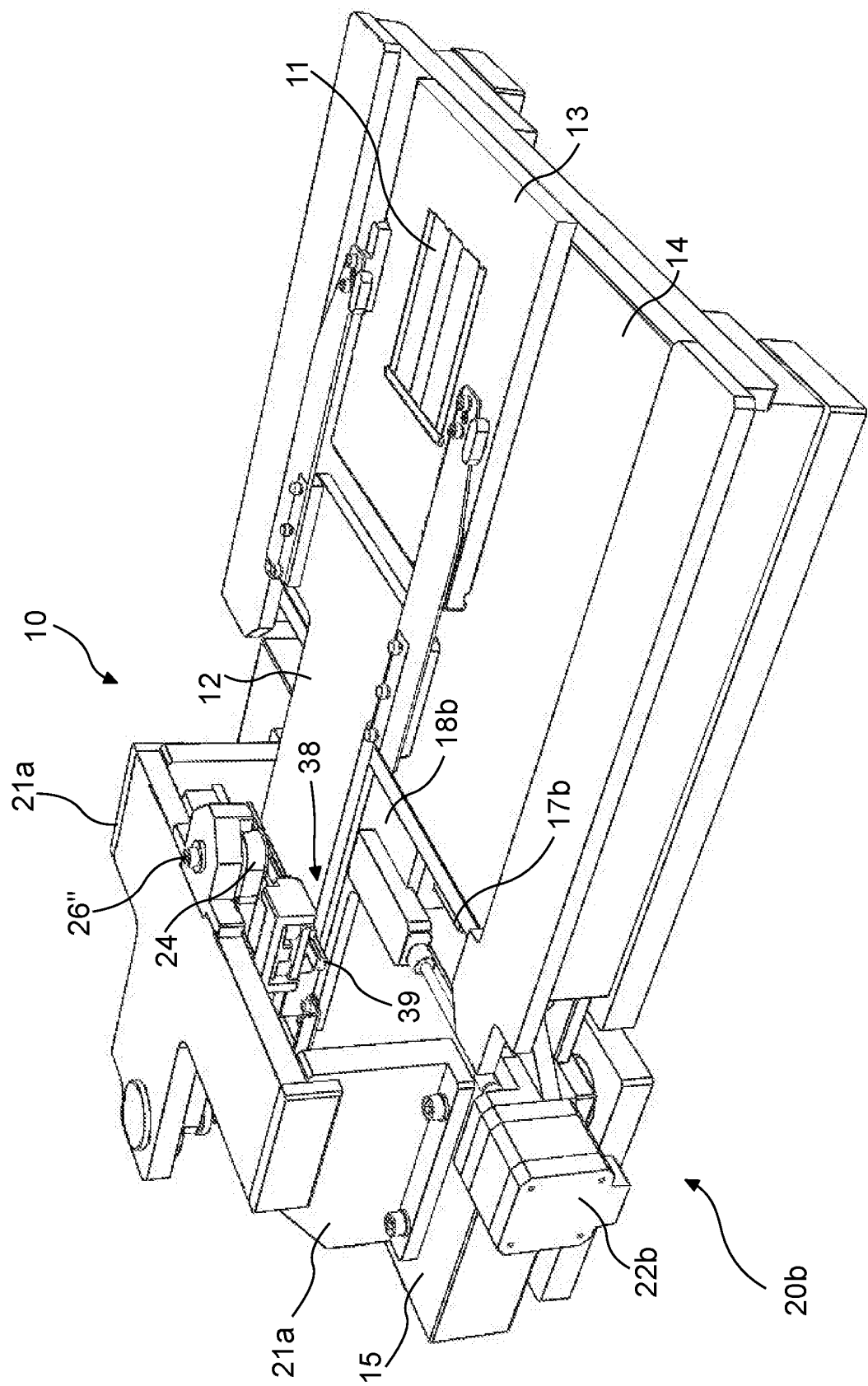

This application is a U.S. National Stage of PCT/HU2018/050030, filed Jun. 22, 2018, which claims priority of Hungarian Patent Application No. P1700279, filed Jun. 23, 2017, each of which is incorporated herein by reference.

The invention relates to a device for moving a microscope stage, which device has a first and second rail system, and has a microscope stage that may be moveably fixed to a first base with the first and second rail systems, furthermore, it contains:

a first drive unit for moving the stage along the first rail system, and connected to the stage via a first drive connection, and a second drive unit for moving the stage along a second rail system positioned at an angle to the first rail system, and connected to the stage via a second drive connection.

The object of the invention also relates to a microscope with a first base that contains such a device for moving a microscope stage.

An essential aspect of microscopy is that the sample being examined should not move significantly from the plane of focus of the objective during the period of examination, otherwise the image of the sample will become blurred and out of focus. Due to the effect of vibration the position of the sample as compared to the plane of focus changes continuously, which may lead to a drastic deterioration of image quality. Vibration is capable of significantly damaging the performance of a microscope, and its negative effect increases as magnification increases. Certain types of microscope, such as light transmission scanning microscopes, are especially sensitive to vibrations.

The vibrations affecting microscopes may be categorised into two main types according to the source of vibration. External vibrations that come from the environment, such as from the movements of the building, from the operation of external electronic devices, or the movements of the persons working with the microscope, etc. Conversely, internal vibrations are caused by the drive motors of the stage, and the cooling fans, etc. Among the internal vibrations, it is characteristically the vibration occurring during the movement of the microscope stage that represent the greatest problem, as these vibrations vibrate the sample directly. Therefore, the elimination of vibrations affecting the microscope stage is an especially important aspect in the interest of improving image quality.

Numerous proposals have been made over the past decades to solve the problem of the effect of vibrations originating from various sources. The essence of the simplest solutions is that the microscope is mechanically isolated from its environment, using a special suspension system, for example. Patent application number WO 2012/040433 discloses a painting machine that filters out the effects of environmental vibration. The stage suspended on springs is positioned on a high-viscosity silicone gel layer, in this way ensuring the appropriate degree of damping. In the case of the scanning microscope presented in patent document number U.S. Pat. No. 6,930,479, the interfering effect of external vibrations is dampened by the stage being constructed on a base with a large mass, and in this way the effect of the external vibrations may be successfully reduced. The greatest disadvantage of the above solutions is that they are not capable of effectively overcoming internal vibration, especially the vibration created with the movement of the stage.

Patent number U.S. Pat. No. 5,731,896 discloses a microscope that reduces the vibrations exerted on the optical system with an electronically controlled vibration compensation module that moves the optical system. In patent application number JP 10148235 the vibrations are extinguished with acoustic waves. The disadvantage of the above solutions is that complicated control electronics are required to implement them, which significantly increases the operation cost of the microscope and the probability of it becoming faulty.

The objective of the invention is to provide a device for moving a microscope stage that is free of the disadvantages of the solutions according to the state of the art, in other words that simply and cost-effectively reduces the extent of the internal vibrations having an impact on the microscope stage.

The invention is based on the recognition that if at least one of the drive units for moving the microscope stage is placed on a base that is mechanically isolated from the other parts of the microscope and is connected to the microscope stage by a belt drive, then the vibrations occurring in connection with the moving of the microscope stage may be effectively isolated from the microscope stage.

Further advantageous embodiments of the invention are defined in the attached dependent claims.

Further details of the invention will be apparent from the accompanying figures and exemplary embodiments.

Figure 2:
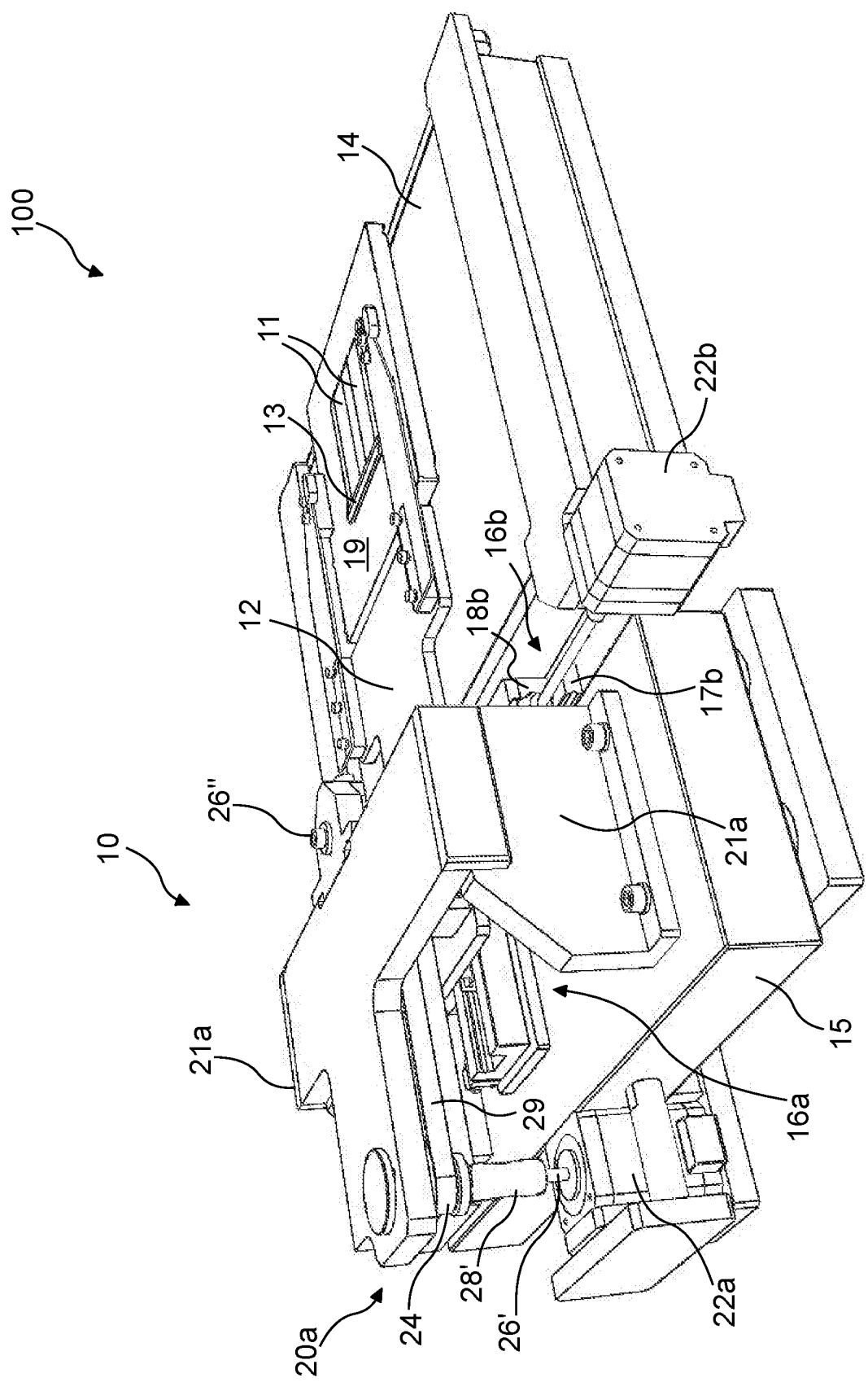
Figure 3:
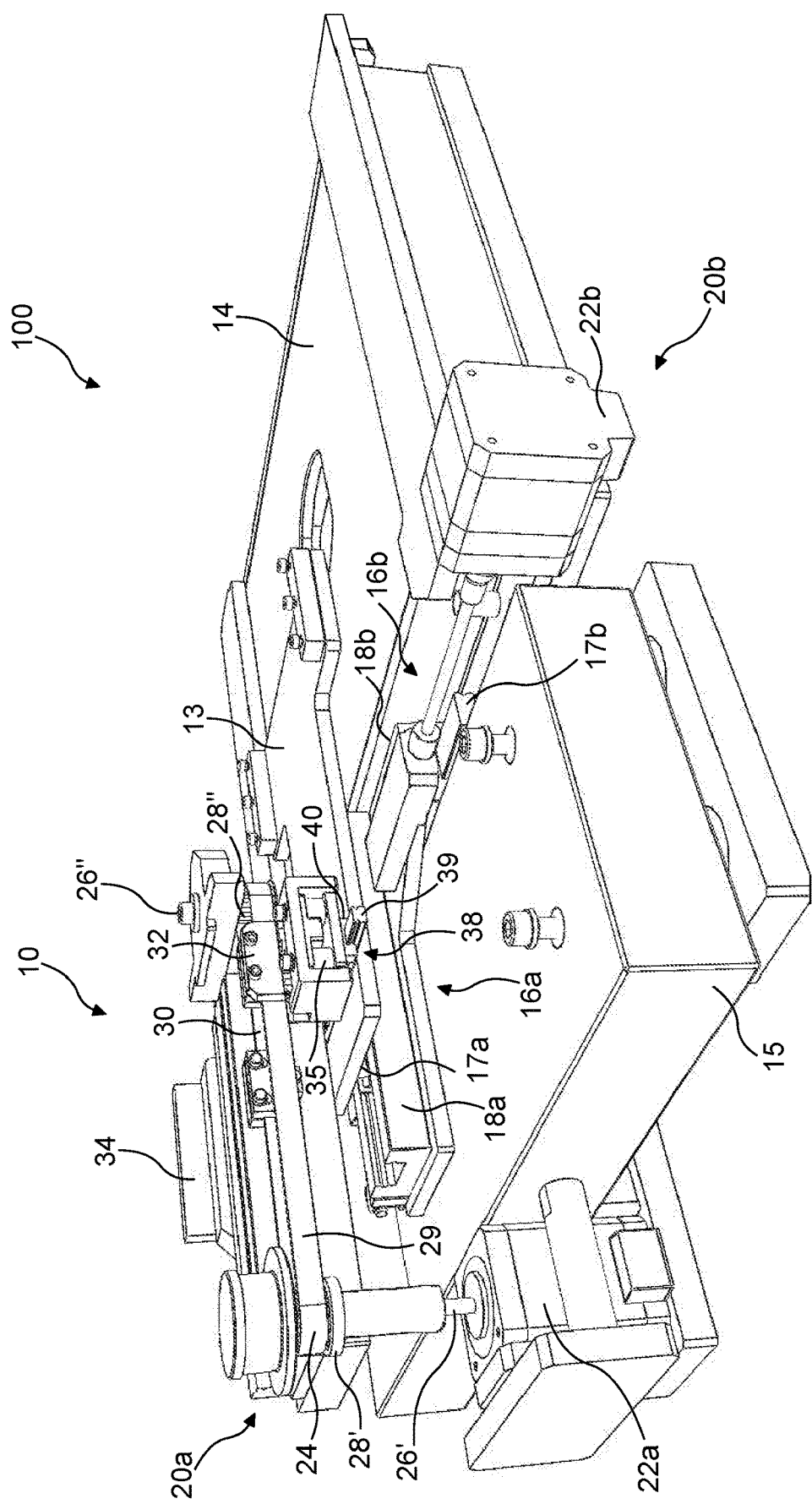

Further details of the invention will be explained by way of exemplary embodiments with reference to the figures, wherein:

FIG. 1 depicts a schematic perspective view of a preferred embodiment of a device for moving a microscope stage according to the invention depicted from a first viewpoint, FIG. 2 depicts a schematic perspective view of the embodiment of the device for moving a microscope stage according to the invention presented in FIG. 1 depicted from a second viewpoint, FIG. 3 depicts a schematic perspective view of the embodiment of the device for moving a microscope stage according to the invention presented in FIG. 1 depicted without the frame of the first drive unit.

A preferred embodiment of a device for moving a microscope stage 10 according to the invention depicted from a first viewpoint can be seen in FIG. 1. The device for moving a microscope stage 10 is adapted for moving the stage 12 of a microscope 100. In the context of the present specification microscope 100 is preferably understood to mean a transmission microscope, but optionally the microscope 100 may be any type of microscope, such as even a confocal scanning microscope.

The microscope 100 has a first base 14, which may be made of, for example, a polished stone block, preferably a granite block, or a metal block. The first base 14 may be comprised of a single element or of several elements fixed to each other that provide suitable structural rigidity, and, as a consequence of its inertia, that absorb the external vibrations and carry the conventional components of the microscope 100, such as objective, camera, light source, etc. (not shown).

In the case of a preferred embodiment the stage 12 contains a microscope slide holder unit 13 that determines the microscope slide holder plane 19. The microscope slide holder unit 13 is adapted for accommodating one or more microscope slides 11 known of in themselves and provided as flat glass plates. In the context of the present invention the microscope slide holder plane 19 is understood to mean the plane parallel to the plane of the microscope slide 11 inserted into the microscope slide holder unit 13, preferably the plane of the surface of the microscope slide holder unit 13. The microscope slide holder unit 13 is preferably connected to the other parts of the stage 12 in a releasable way, by using screws, for example, as can be seen in FIG. 2, for example.

The stage 12 is moveably fixed to the first base 14 with the first rail system 16a and the second rail system 16b. In the context of the present invention, the rail systems 16a, 16b are understood to mean a moving system containing guide rails 17a, 17b and rail cars 18a, 18b connected to them, as is known by a person skilled in the art. The guide rails 17a, 17b and the rail cars 18a, 18b may be moved with respect to each other in the directions along the guide rails 17a, 17b. It should be noted here that in the use of the wording of the present specification, if the guide rails 17a, 17b are fixed, the rail cars 18a, 18b are guided by the guide rails 17a, 17b, if the rail cars 18a, 18b are fixed then the rail cars 18a, 18b guide the guiderails 17a, 17b. The rail systems 16a, 16b may be slide track, roller track, roller bearing, roller or ball rail systems, as is obvious for a person skilled in the art.

In the case of a preferred embodiment the rail systems 16a, 16b are provided as rail systems, preferably cross roller rail systems 16a, 16b, containing linear, i.e. straight, guide rails 17a, 17b for guiding the stage 12 in perpendicular X and Y directions that are parallel to the microscope slide holder plane 19, and one of the rail systems 16a, 16b is fixed to the first base 14, and the other is fixed to the rail system 16a, 16b fixed to the first base 14. The fixing of the rail system 16a, 16b to the first base 14 is understood to mean the fixing of the guide rail 17a, 17b or the rail car 18a, 18b to the first base 14.

In the case of the preferred embodiment shown in FIGS. 1 and 2, the guide rail 17b of the second rail system 16b is fixed to the first base 14, and the rail car 18b is fitted to the guide rail 17b. The rail car 18b may be freely moved along the guide rail 17b, in other words the rail car 18b is moveably fixed to the first base 14 via the guide rail 17b. The first rail car 18a of the first rail system 16a is connected to the second rail car 18b in a releasable or non-releasable way, as a result of which the rail car 18b moves the rail car 18a also moves as compared to the first base 14. The connections among the elements of the rail systems 16a, 16b naturally also includes the case when the releasable or non-releasable connection is implemented with a bridging element, such as a metal sheet.

The stage 12 is fixed to the guide rail 17a, which guide rail 17a is connected to the rail car 18a and is guided by the rail car 18a. The moveable securing implemented with the help of the rail systems 16a, 16b is understood to mean that the stage 12 is indirectly connected to the first base 14 via the guide rails 17a, 17b, which are capable of moving with respect to each other, and via the rail cars 18a, 18b.

Optionally, an embodiment may be conceived in the case of which the rail car 18b of the second rail system 16b is secured to the first base 14, and the guide rail 17b is fitted to the rail car 18b. The stage 12 is secured to the first rail car 18a of the first rail system 16a, or, optionally, to its guide rail 17a, which rail car 18a or guide rail 17a is connected to the second guide rail 17b.

In the case of another exemplary embodiment, the guide rail 17a of the first rail system 16a is secured to the first base 14, and the rail car 18a is fitted to the guide rail 17a. The rail car 18a may be freely moved along the guide rail 17a, in other words the rail car 18a is moveably secured to the first base 14. The second rail car 18b of the second rail system 16b is connected to the first rail car 18a, due to which when the rail car 18a moves the rail car 18b also moves with respect to the first base 14. The stage 12 is secured to the guide rail 17b, which guide rail 17b is connected to the rail car 18b and is guided by the rail car 18a.

Optionally, an embodiment may be conceived in the case of which the rail car 18a of the first rail system 16a is secured to the first base 14, and the guide rail 17a is fitted to the rail car 18a. The stage 12 is secured to the second rail car 18b of the second rail system 16b, or, optionally to its guide rail 17b, which rail car 18b or guide rail 17b is connected to the first guide rail 17a.

The device for moving a microscope stage 10 contains a first drive unit 20a for moving the stage 12 along the first rail system 16a and that has a first drive connection with the stage 12. The device 10 also contains a second drive unit 20b for moving the stage 12 along the second rail system 16b and that has a second drive connection with the stage 12. In the context of the present invention movement along the rail systems 16a, 16b is understood to mean movement in the directions determined by the guide rails 17a, 17b.

The first drive unit 20a of the device 10 is arranged on a second base 15 mechanically isolated from the first base 14, and the first drive connection is provided as a belt drive. Similarly to the first base 14, the second base 15 may be made of a polished stone block, preferably a granite block, or a metal block, it be comprised of a single element or, optionally, of several elements fixed to each other, to which the first drive unit 20a may be secured.

In the case of a preferred embodiment, the first drive unit 20a contains a first stepper motor 22a, and the second drive unit 20b contains a second stepper motor 22b, as illustrated in FIG. 2. The first and second stepper motors 22a, 22b are preferably electric motors, which even more preferably are five-phase electric motors. The first drive unit 20a has a frame 21a made of metal, such as aluminium, which, preferably, is secured with a releasable connection to the second base 15 and gives the appropriate structural stability to the drive unit 20a.

In the case of the embodiment illustrated in FIGS. 1, 2 and 3, the second drive unit 20b is arranged on the first base 14, and the second drive connection is provided as a spindle drive. Naturally, optionally, an embodiment is conceivable in the case of which the second drive unit 20b is arranged on the second base 15, and the second drive connection is implemented with the help of a belt drive.

In the case of the present invention, mechanical isolation means that the resonances created by the first drive unit 20a, especially by the stepper motor 22a are essentially unable to spread from the second base 15 to the first base 14. In other words, there is no effective connection between the second base 15 and the first base 14. Such mechanical isolation may be implemented, for example, by the physical separation of the first base 14 and the second base 15, and/or by suitably selecting the masses of the first base 14 and of the second base 15, as is known by a person skilled in the art.

The first drive unit 20a is connected to the stage 12 via the first drive connection provided as a belt drive. The first drive connection contains a belt 24, preferably a toothed belt, but optionally the use of other types of belt is also conceivable, such as a flat belt, round belt, v-belt, ribbed belt, etc. The belt 24 is flexible, and in terms of material it may be made of, for example, plastic, synthetic fibre or steel-reinforced rubber, etc., as is known by a person skilled in the art. The advantage of a belt 24 provided as a toothed belt is that it makes precise synchronous drive possible, at the same time as maintaining the usual advantages of a belt drive, in other words ensuring noiseless, peaceful operation, and it also has excellent vibration damping features.

In the case of the preferred embodiment shown in FIG. 3, the belt 24 runs on the driving belt disc 28' rotating around the driving axle 26' secured to the drive unit 20a, even more preferably to its frame 21a, and on the driven belt disc 28" rotating around the driven axle 26", parallel to the driving axle 26', secured to the frame 21a. As a result of this, the driving and driven belt discs 28', 28" divide the belt 24 into a first belt section 29 and second belt section 30 parallel to each other and to the first rail system 16a.

The securing of the axles 26', 26" may be implemented, for example, in such a way that the axles 26', 26" are secured to the frame 21a in a fixed way, in other words so that the axles 26', 26" are unable to move as compared to the frame 21a. In this case the belt discs 28', 28" are rotatably connected to the axles 26', 26" with the help of bearings, for example.

In the case of another embodiment, the axles 26', 26" are rotatably connected to the first drive unit 20a, preferably to its frame 21a with the use of bearings, for example. In the case of this embodiment, the belt discs 28', 28" are secured to the axles 26', 26" in a fixed way, therefore they may be rotated together.

The stepper motor 22a is adapted for rotating the belt disc 28' and for driving the belt 24. According to the above embodiments, the stepper motor 22a is directly or indirectly connected to the belt disc 28' or to the axle 26'. An indirect connection may be implemented, for example, by using gears, as is obvious for a person skilled in the art.

In the case of a preferred embodiment a coupling element 32 for connecting the belt 24 to the stage 12 is secured in a fixed way to the first belt section 29, and a counterweight 34 with a mass substantially equal to the joint masses of the coupling element 32 and the stage 12 is secured to the second belt section 30 in a fixed way, the function of which counterweight 34 will be explained at a later point. In the case of a preferred embodiment the first drive unit 20a contains a third rail system (not shown) arranged in parallel to the belt sections 29, 30 and connected to the second base 15 via the frame 21a, which serves to guide the counterweight 34 in parallel with the first rail system 16a. The third rail system is preferably provided as a ball bearing rail system, but optionally the use of other types of rail system may also be conceived.

The task of the coupling element 32 is to create a fixing connection between the belt 24 and the stage 12. The coupling element 32 may be made, for example, from metal, plastic, rubber, etc. In the case of an especially preferred embodiment, a fourth rail system 38 arranged in parallel to the second rail system 16b is secured to the stage 12, and the coupling element 32 is connected to the stage 12 via the fourth rail system 38. The fourth rail system 38 has a guide rail 39 secured to the stage 12, and a rail car 40 that is fixed to the coupling element 32 and that may be moved along the guide rail 39. Naturally, optionally an embodiment is conceivable in the case of which the guide rail 39 is fixed to the coupling element 32. As a result of the securing with the rail system 38, the stage 12 is able to move freely, as compared to the coupling element 32, perpendicular to the belt sections 29, 30, in other words in the directions along the second rail system 16b. In contrast the stage 12 is only able to move together with the coupling element 32, in parallel with the belt sections 29, 30, in other words in the directions along the first rail system 16a.

Optionally the coupling element 32 may contain one or more damping elements 35, such as rubber mounts, serving to prevent the mechanical transmission of vibrations between the belt 24 and the stage 12.

In the case of a preferred embodiment, the device 10 according to the invention contains a sensor, preferably an optical path measuring device (not shown) for determining the momentary position of the stage 12 as compared to the drive unit 20a. The sensor provided as an optical path measuring device is a contactless device operating on an optical principle suitable for building an incremental or preferable absolute measuring system. The sensor provided as an optical path measuring device contains a scale provided with several transparent and opaque divisions, as well as a reading head suitable for sensing and procession the information on the scale, such as a photoelectric sensor. By using the path measuring sensor the momentary position of the stage 12 as compared to the drive unit 20a may be determined with up to nanometre precision. Naturally, optionally other types of path measuring sensor are conceivable such as laser, magnetic, inductive or potentiometer sensors, etc., as is known by a person skilled in the art.

The subject of the invention also relates to a microscope 100, which has a first base 14, and a device for moving a microscope stage 10 according to the invention. In the case of a preferred embodiment, the first base 14 and/or the second base 15 is a stone block, preferably a granite block, or a metal block.

The operation of the device for moving a microscope stage 10 and microscope 100 according to the invention is presented in the following.

The microscope 100 is preferably a high-speed light transmitting scanning microscope, with which a digital image of the sample on the microscope slide 11 can be captured. In the case of high resolution, the entire sample does not fit in the field of view of the objective of the microscope 100, therefore the digital image has to be assembled from several images. In the course of this columns next to each other and parallel to the longer side of the rectangular microscope slide 11 are scanned column by column as follows.

The microscope slide 11 is placed in the slide holder unit 13 so that the longer sides of the rectangular microscope slide 13 are parallel to the first rail system 16a, then the microscope slide 11 is shifted as compared to the first base 14 in the direction parallel to its longer sides in the microscope slide holder plane 19. The shifting may involve that the microscope slide 11 recedes from the first drive unit 20a during shifting, or, optionally, that the microscope slide approaches the first drive unit 20a. In order to shift the microscope slide 11, the belt disc 28', and, via that, the belt 24 is driven in the desired direction with the stepper motor 22a of the drive unit 20a. The rotating motion of the axle of the stepper motor 22a is transformed into the linear movement of the belt sections 29, 30 via the belt discs 28', 28" and the belt 24. The first belt section 29 of the belt 24 is connected to the stage 12 with the coupling element 32, in this way by moving the belt 24 the stage 12 moves along the first rail system 16a. As the stepper motor 22a is connected to the stage 12 via the belt 24, which provides flexible drive transfer, the mechanical vibrations generated during the operation of the stepper motor 22a are essentially not transferred to the stage 12 or to the microscope slide 11. The vibrations generated by the stepper motor 22a are only transferred by the belt 24 to a very low extent, as a result of which the examined sample always remains in the plane of focus throughout the entire scanning process, thereby significantly improving imaging quality. The extent of the transfer of vibrations between the stepper motor 22a and the stage 12 may be further reduced with the use of the damping elements 35 located in the coupling element 32.

In the case of an especially preferred embodiment, a counterweight 34 is secured to the belt section 30 according to that described above. In the course of the movement of the stage 12 along the rail system 16a, the counterweight 34 moves parallel with the rail system 16a at the same speed as and in the opposite direction to the movement of the stage 12. As the mass of the counterweight is essentially the same as the joint mass of the stage 12 and the coupling element 32, the masses moving at the same speed but in opposite directions, in other words the impulses of the counterweight 34, and of the stage 12 and the coupling element 32 in practice cancel each other out.

The scanning of a given column may be continuous or intermittent. In the latter case the stepper motor 22a is stopped at predetermined intervals, then started again. With the help of the path measuring sensor the position of the stage 12 with respect to the microscope 100 may be determined at every moment. After the scanning of the given column has been completed, the microscope slide 11 is shifted with the second drive unit 20b in the direction perpendicular to the scanning direction, along the second rail system 16b, then the neighbouring column is also scanned according to that described above. The scanning of the columns parallel to each other is continued until a digital image is made of the entire sample.

As in the case of this embodiment the scanning is only performed in the directions along the first rail system 16a, it is not absolutely necessary to isolate the vibrations generated during the operation of the second drive unit 20b from the stage 12. Optionally, of course, embodiments are conceivable where, similarly to the first drive unit 20a, the second drive unit 20b is arranged on the second base 15, and the movement of the stage 12 along the second rail system 16b takes place by belt drive.

Various modifications to the above disclosed embodiments will be apparent to a person skilled in the art without departing from the scope of protection determined by the attached claims.

The invention claimed is:

1. Device for moving a microscope, which device has a first and second rail system, and has a microscope stage that may be moveably fixed to a first base with the first and second rail systems, furthermore, it contains:
   a first drive unit for moving the stage along the first rail system, connected to the stage via a first drive connection, and
   a second drive unit for moving the stage along the second rail system positioned at an angle to the first rail system, connected to the stage via the second drive connection, characterised by that the first drive unit is arranged on a second base that is mechanically isolated from the first base, and the first drive connection is provided as a belt drive.

2. Device for moving a microscope according to claim 1, characterised by that the stage contains a microscope slide holder unit defining a microscope slide holder plane.

3. Device for moving a microscope according to claim 2, characterised by that the first and second rail systems are provided as rail systems, and one of the rail systems is fixed to the first base, and the other is fixed to the rail system fixed to the first base.

4. Device for moving a microscope according to claim 1, characterised by that the second drive unit is arranged on the second base, and the second drive connection is provided as a belt drive.

5. Device for moving a microscope according to claim 1, characterised by that the second drive unit is arranged on the first base, and the second drive connection is provided as a spindle drive.

6. Device for moving a microscope according to claim 1, characterised by that the belt drive of the first drive connection contains a belt which belt runs on a driving belt disc rotating around a driving axle secured to the first drive unit, and on a driven belt disc rotating around a driven axle secured to the first drive unit and parallel to the driving axle, where the driving and driven belt discs divide the belt into a first and second belt section parallel to each other and to the first rail system.

7. Device for moving a microscope according to claim 6, characterised by that a coupling element for connecting the belt to the stage is secured to the first belt section, and a counterweight with a mass substantially equal to a total mass of the coupling element and the stage is secured to the second belt section.

8. Device for moving a microscope according to claim 7, characterised by that a third rail system is arranged in parallel to the belt sections and is connected to the second base guiding the counterweight.

9. Device for moving a microscope according to claim 7, characterised by that a fourth rail system arranged in parallel to the second rail system is secured to the stage, and the coupling element is connected to the stage via the fourth rail system.

10. Device for moving a microscope according to claim 7, characterised by that the coupling element contains one or more damping elements for preventing the mechanical transmission of vibration between the belt and the stage.

11. Device for moving a microscope according to claim 1, characterised by that it contains a sensor for determining the momentary position of the stage.

12. Device for moving a microscope according to claim 1, characterised by that the first drive unit contains a first stepper motor, the second drive unit contains a second stepper motor.

13. Microscope, which has a first base, characterised by that it contains the device for moving a microscope according to claim 1.

14. Microscope according to claim 13, characterised by that at least one of said first base and said second base is a stone block.

15. The device according to claim 6 wherein the belt is a toothed belt.

16. he device according to claim 8 wherein the third rail system is a ball rail system.

17. The device according to claim 11 wherein the sensor is an optical path measuring device.

18. The device according to claim 12 wherein the stepper motors are five-phase electric motors.

19. The microscope according to claim 14 wherein the stone block is a granite block.

20. The microscope according to claim 13 wherein at least one of said first base and said second base is a metal block.

21. The microscope according to claim 3 wherein the rail systems are cross roller rail systems for guiding the stage in perpendicular X and Y directions and parallel to the microscope slide holder plane.

* * * * *